United States Patent [19]

Ono et al.

[11] 4,233,352
[45] Nov. 11, 1980

[54] POLYESTER FILM AND METHOD OF MANUFACTURE THEREOF

[75] Inventors: Masaaki Ono, Otsu; Kazuo Okabe, Kyoto; Yasuki Miura, Otsu, all of Japan

[73] Assignee: Toray Industries, Inc., Tokyo, Japan

[21] Appl. No.: 2,230

[22] Filed: Jan. 9, 1979

[30] Foreign Application Priority Data

Jan. 9, 1978 [JP] Japan ......................... 53-518

[51] Int. Cl.³ ............................. H01F 10/02
[52] U.S. Cl. ......................... 428/141; 427/127;
427/128; 427/130; 427/331; 427/372.2;
428/145; 428/147; 428/149; 428/152; 428/447;
428/480; 428/483; 428/484; 428/900
[58] Field of Search ............... 428/141, 145, 147, 149,
428/152, 447, 480, 483, 484, 900; 427/127, 128,
130, 331, 372 R

[56] References Cited

U.S. PATENT DOCUMENTS

| 3,993,846 | 11/1976 | Higuchi | 428/900 |
|---|---|---|---|
| 4,007,313 | 2/1977 | Higuchi | 428/900 |
| 4,135,032 | 1/1979 | Akashi | 428/900 |

*Primary Examiner*—Marion Mc Camish
*Attorney, Agent, or Firm*—Miller & Prestia

[57] ABSTRACT

A slippery and smooth-surfaced polyester film, at least one surface of which is covered with worm-like nodules, useful as a base film for high recording density magnetic tape.

39 Claims, 1 Drawing Figure

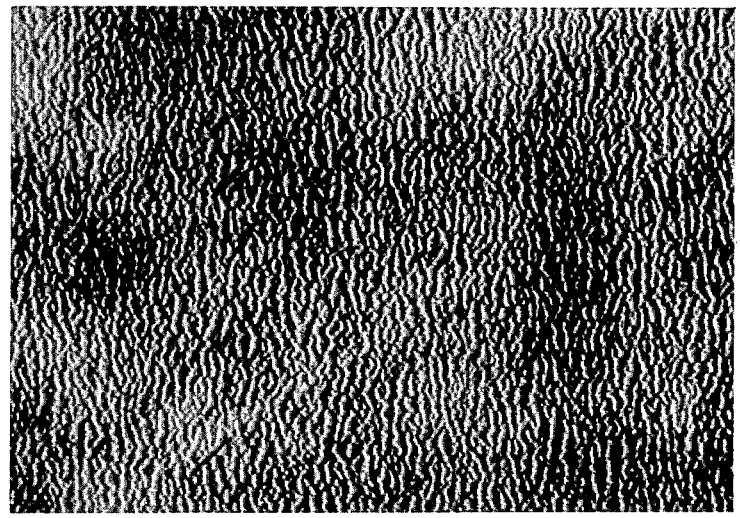

POLYESTER FILM AND METHOD OF MANUFACTURE THEREOF

BACKGROUND OF THE INVENTION

Important among the basic qualities of magnetic tape are electromagnetic performance and running properties. From the electromagnetic performance point of view, the higher the magnetic recording density becomes, the smoother its surface must be. This requires a very smooth surfaced base film for high recording density magnetic tape. From the running property point of view, magnetic base film must be slippery. In general these are contradictory properties; smooth-surfaced films have had poor running qualities due to lack of slipperiness, while slippery films have had excellent running qualities but (at least partly because of surface roughness) poor electromagnetic performance especially at high recording density. In order to solve these contradictory problems several attempts have been made. One of them has involved a dual-surface PEt film which has both smooth and rough surfaces. However, the smooth surfaces are easily damaged by the adjacent rough surfaces when wound as a roll.

An important object of this invention is to provide a smooth, slippery, and abrasion-resistant polyester film which also has excellent electromagnetic performance.

SUMMARY OF THE INVENTION

The present invention provides a polyester film having not only a smooth surface providing excellent electromagnetic performance but good running properties as well. It has smooth surfaces, at least one surface of which is covered with fine worm-like nodules comprising a mixture of water-soluble polymer, polysiloxane and/or styrene-butadiene-rubber, and optionally natural wax if necessary. This film is very suitable for use as a base film for super-high recording density magnetic tape. It is also suitable for use as a condenser base film, or as a photographic film or a printing base film.

DETAILED DESCRIPTION OF THE INVENTION

The present invention relates to a polyester film having improved surfaces for use as magnetic tapes, photographic films, electro-copy films, condensers, etc.

Home video tape recorders have become very light and compact and utilize high-recording density systems. Magnetic layers of the video tapes used in such systems must be very smooth. Because of the thinner magnetic layer thickness, the base film surface must be smooth as well.

However, known smooth-surfaced base films are not slippery at all. Therefore, the handling of the film is very difficult in the production of both base films and magnetic tapes. In addition, as a very critical disadvantage, the magnetic tapes made from such films have poor running properties.

An essential quality of magnetic tapes is to provide both good magnetic recording properties and good running properties. The base films for magnetic tapes must accordingly have very smooth surfaces for the magnetically coated side and slippery surfaces for the non-coated side. Further polyester film for use as a condenser must have a very smooth surface because of the requirements of electrical performance and must also have a slippery surface because of the good handling properties that are required in the winding process utilized in manufacture of the condenser. The foregoing also applies in the case of photographic films, electro-copy films, printing films and others.

In order to obtain such base films several attempts have been made. They include, for example, the use of (a) fine inert particle-dispersed films made of polyester containing fine inert particles, (b) dual-surface films consisting of a smooth surface layer and a rough surface layer having protrusions, and (c) chemically etched films made by chemical etching of smooth surface films. However, all of these films have many defects. Fine inert particle-dispersed films have only moderately smooth and moderately rough surfaces, or highly compromised surfaces having properties somewhere between smooth and rough ones. In the case of dual-surface films the profile of the rough surface is undesirably transferred to the smooth surface when the film is wound as a roll; thus the smooth surface becomes rough. Chemically etched film has the further disadvantage of requiring very complicated and difficult production procedures.

The present invention overcomes the foregoing obstacles and provides a smooth and slippery, abrasion-resistant polyester film having excellent properties.

The polyester film of this invention is a smooth-surfaced polyester film at least one surface of which is covered with fine worm-like nodules formed from a mixture of a water-soluble polymer having a molecular weight of about 10,000–2,000,000 and a water-emulsifiable polymer which may be a polysiloxane having a molecular weight of about 30,000–300,000 and/or a styrene-butadiene-rubber (SBR) having a molecular weight of about 20,000–1,000,000, and (optionally) natural wax, if necessary.

In the practice of this invention, the usual saturated linear polyesters may be used as the film material, such as polyethylene terephthalate, polytetramethylene terephthalate, poly-1,4-cyclohexanedimethylene terephthalate, polyethylene 2,6-naphthalate and polyethylene p-oxybenzoate, for example. Of course, copolyesters which contain other compounds as minor components can be used, also. Such other compounds which may be used include diols such as diethylene glycol, propylene glycol, neopentyl glycol, polyethylene glycol, p-xylene glycol, 1,4-cyclohexane dimethanol, dicarboxylic acids, such as adipic acid, sebacic acid, phthalic acid, isophthalic acid, 2,6-naphthalene dicarboxylic acid, or 5-sodium sulfonate isophthalic acid, tricarboxylic acids, such as trimellitic acid or pyromellitic acid, or p-oxyethoxy benzoic acid. The minor component content should be less than about 20 mol %. The polyester, of source, may contain the usual additives such as inert pigments, antistatic agents and the like.

Surface smoothness may readily be determined by causing relative movement between the surface and a stylus which probes the existing surface irregularities. In the present invention "smooth surface" is defined as that surface wherein the $R_a$ value at 0.08 mm wavelength cut off is less than about $0.015\mu$ at any part of the film surface. The $R_a$ value is subjected to the aforementioned cut-off to eliminate longer waviness and to differentiate true roughness, The $R_a$ value may be obtained by using a stylus-type surface tester. The $R_a$ value is the arithmetic mean of the absolute values of the heights or depths of the surface roughness curve obtained by eliminating a certain amount of waviness from the profile curve by adopting a proper cut-off value from the center line, which is obtained by leveling the roughness curve's mountains and valleys. (DIN 4768). In effect, average roughness is determined by measuring the areas under the roughness waves for a given test length and then dividing by the length.

The $R_a$ values of the slippery surface of the film of the present invention vary within the range of about 0.005 to 0.015μ as the composition of the nodules varies. The $R_a$ values of usual polyester films are above about 0.02μ.

In accordance with this invention, a worm-like nodule is defined as a protrusion on the film surface which is like a worm in shape and which is preferentially aligned substantially in the machine direction of the film, and the size of which is about 0.1μ–50μ, preferably about 0.5μ–15μ long; about 0.1μ–10μ preferably about 0.1μ–3μ wide; and about 0.005μ –0.3μ, preferably about 0.01μ–0.1μ high. The population density of the worm-like nodules on the surface of the film is preferably about $10^5$–$10^9$ nodules/cm$^2$, more preferably about $10^6$–$10^8$ nodules/cm$^2$.

FIG. 1 is a photomicrograph using the differential contrast technique of a typical film surface of this invention, covered with worm-like nodules.

The coefficient of friction (ASTM D-1894-63) of the slippery surface, i.e., the surface covered with the worm-like nodules, is as follows. The static coefficient of friction ($\mu_s$) and the kinetic coefficient of friction ($\mu_k$) between the covered surfaces is $\mu_s/\mu_k = 0.15/0.10$–$0.56/0.49$ and $\mu_s/\mu_k = 0.20/0.10$–$0.87/0.80$ between the covered surface and uncovered surface. these values are very smooth compared with the values of the usual films $\mu_s/\mu_k = 0.45/0.40$–$2.0/1.0$.

The water-soluble polymer used in the present invention can be any polymer which is soluble in water and whose molecular weight is about 10,000–2,000,000. If the molecular weight of the polymer is less than about 10,000, the worm-like noludes become soft, the structure becomes easily deformed and the abrasion-resistance of the nodules become poor. If the molecular weight of the polymer is more than about 2,000,000, the worm-like nodules become too hard and brittle and the abrasion-resistance also becomes poor.

Suitable water-soluble polymers include, for example, methylcellulose, hydroxyethylcellulose, carboxymethylcellulose, polyvinyl alcohol, gum tragacanth, gum arabic, casein, and gelatin.

The polysiloxane used in the present invention has a molecular weight of about 30,000–300,000 and preferably has a

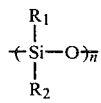

structure where $R_1$ is $CH_3$, $C_6H_5$ or H, $R_2$ is $CH_3$, $C_6H_5$, H, or a crosslinkable functional group such as an epoxy group, amino group, hydroxy group or the like.

If necessary, a cross-linking catalyst or crosslinker is used equivalently according to the functional groups that are present. For example, $MgCl_2$ may be used in the case of epoxy groups. In this invention the silicones used are not necessarily of the same kind. A mixture of several kinds of polysiloxanes can be used.

The preferable range of molecular weight of the polysiloxane is about 30,000–300,000. If the molecular weight of the silicone is less than about 30,000, the wormlike nodules become too soft and easily deformed. If the molecular weight of the silicone is more than about 3000,000, the worm-like nodules become too brittle.

Styrene-butadiene-rubber (SBR), one of the components in the present invention, has a molecular weight of about 20,000–1,000,000, preferably about 100,000–500,000. If the molecular weight of the SBR is less than about 20,000, the worm-like nodules become soft, easily deformed and structurally unstable. If the molecular weight of the SBR is more than about 2,000,000, the worm-like nodules become brittle and their abrasion resistance becomes poor.

SBR components such as low-styrene SBR whose styrene content is about 10–20 wt.%, middle styrene SBR whose styrene content is about 20–40 wt.%, and high styrene SBR whose styrene content is about 40–80 wt.% are used. Alternatively, SBR copolymerized with a third component whose content is about 2–10 wt.% can be used. A suitable example is styrene-butadiene-vinyl-pyridine trinary copolymer. Among these SBR components, high styrene SBR having a styrene content of about 40–80 wt.% is preferable. Sometimes cross-linkers such as melamine or sulfur may be used in amounts of about 5–10 wt.% to the SBR content, if necessary.

Natural wax preferably can be used with the above mentioned components. It helps the slipperiness of the worm-like nodules together with the silicones. Such natural waxes include, for example, carnauba wax, spermaceti, beeswax, chinese insect wax, ouricuri wax, and the like.

The ratio of the weight content of the water-soluble polymer to polysiloxane and/or SBR is about 1-100-:5-50. The ratio of the weight content of the water-soluble polymer to polysiloxane and/or SBR to natural wax is about 1-100 : 5-50 : 5-100.

If the water-soluble polymer content is less than the above value, the worm-like nodules become difficult to form, and the slipperiness of the product becomes poor. Further, its abrasion resistance becomes poor. If the content is more than the above value, the worm-like nodules become too large and the surface which they cover becomes rough.

If the polysiloxane and/or SBR content is less or more than the above value, the abrasion resistance of the nodules becomes poor.

If the natural wax content is less than the above value, the slipperiness sometimes becomes poor, and if the natural wax content is more than that specified the abrasion resistance of the product becomes poor.

Surfaces covered with the worm-like nodules as in the present invention have the same or even better abrasion resistance as compared to ordinary film surfaces. Abrasion resistance is tested by counting the scratches resulting from 500 repeated running passes of a film on a metal guide. Because the compilation of the magnetic tapes is done by cutting and fastening by the adhesive tapes such as "Scotch" tapes, the base film has an adhesive property to some degree. The slippery surface of the present invention covered with worm-like nodules meets this requirement.

FILM MANUFACTURE

A water emulsion comprising a mixture of a water-soluble polymer having a molecular weight of about 10,000–2,000,000 and a polysiloxane having a molecular weight of about 30,000–300,000, and/or styrene-butadiene-rubber (SBR) having a molecular weight of about 20,000–1,000,000 (and natural wax, if necessary) is coated on at least one surface of a uniaxially oriented smooth-surfaced film obtained in the usual way. After drying the emulsion, the coated film is stretched in the transverse direction and heat set, or after stretching in the transverse direction is again stretched in the machine direction and heat set. Stretching in the transverse direction tends to split the coating to form the worm-like nodules. Further stretching in the machine direction tends to break up the worm-like nodules lengthwise.

More concretely, a polyethylene terephthalate raw material as heretofore described is extruded from a die and chilled on a rotating casting drum. The chilled sheet is stretched about $3.0\times$ to $5.0$ times in the machine direction. Then at least one surface of the uniaxially oriented smooth-surfaced film is coated with a water-emulsion (a mixture of water-soluble polymer, polysiloxane, and/or SBR, and cross-linking agent if necessary, and natural wax if desired) by use of any proper coating method. The composition of the water-emulsion is so controlled as to provide the desired content ratio of the worm-like nodules as heretofore described.

The water-soluble polymer increases the viscosity of the water emulsion and causes the water emulsion to wet the surface of the film when coating. After the nodules are formed it assists the nodules to adhere to the polyester film surface, strengthens the abrasion resistance of the surface covered with the worm-like nodules, and confers moderate adhesive properties to the surface. A surface active agent can also be used in the water emulsion. These include, for example, anion, cation or nonion surface active agents, but the anion and the nonion surface active agents serve better to increase the water emulsion stability.

The water emulsion is coated in an amount of about 3 to 1,500 mg/m$^2$ on at least one surface of the film. Then the water must be evaporated and the product dried to form a layer of the mixture and this is accomplished before stretching the film in the transverse direction. This is done by preheating the water-emulsion coated film with hot air at a temperature of about 100°–150° C. The water-drying speed may be about 5%/sec–100%/sec and this may be carried out in a preheating section in a tenter frame. After preheating, the film is stretched between about $2.5\times$ to $4.5$ times in the transverse direction at about 90°–120° C. This transverse stretching after drying and making a layer partially creates novel worm-like nodules extending in the machine direction on the film surface. Then the film is optionally re-stretched about $1.0\times$–$1.8$ times in the machine direction breaking the worm-like nodules into short lengths. Next the film is heat-set at about 180°–250° C. A balanced or tensilized biaxially oriented polyester film, one surface of which is smooth and the other surface of which is smooth and slippery, or both surfaces of which are smooth and slippery, is obtained. Slipperiness is achieved as a result of the presence of a multiplicity of fine worm-like nodules spaced apart from each other on the surface of the film.

In the present invention the slippery surface i.e., the surface which is covered with the fine worm-like nodules, has much less roughness and is much smoother than usual films, so the smooth surface is not roughened by contacting adjacent slippery surfaces when wound as a roll. In the case where both surfaces are covered by the worm-like nodules, both surfaces of the film are smooth and slippery.

The present invention is further illustrated by the following specific examples, which are intended to be illustrative but not to limit the scope of the invention, which is defined in the appended claims.

EXAMPLE 1

A water emulsion containing the following three compounds was prepared.

| | |
|---|---|
| Polydimethylsiloxane having epoxy groups; emulsion (solid content 20 wt. %): | 0.40 wt. % |
| Magnesium chloride emulsion (solid cont. 20 wt. %): | 0.010 wt. % |
| Methylcellulose: | 0.30 wt. % |

On the other hand a substantially amorphous and non-oriented polyethylene terephthalate raw material was provided containing a minimum amount of inner particles which resulted from polymerization catalyst. This raw material was extruded from a die and chilled on a rotating casting drum maintained at a temperature of 20° C., and the chilled sheet was stretched $3.4\times$ in the machine direction (MD). Then one surface of the MD stretched film was coated by a metaling bar coater with the above-prepared water emulsion, using a quantity of 80 mg. solid content/m$^2$ surface. The film was dried and stretched $3.4\times$ in the transverse direction (TD) using a tentor. The drying and pre-heating temperature was 115° C. and the water-drying speed was 15 %/sec. Then the film was heat set at a temperature of 200° C. A 16 micron-thick balanced biaxially oriented polyethylene terephthalate (PET) film, one surface of which was very smooth and the other surface of which was covered with fine worm-like nodules, was obtained. The properties of this film are shown in Table 1 which appears at the end of these examples.

EXAMPLE 2

The general procedure of Example 1 was repeated except that the first MD stretch ratio was $3.0\times$ and that after the TD stretching, the film was restretched $1.6\times$ in MD and heat set at 200° C. A 14 micron-thick tensilized PET film having a surface similar to Example 1 was obtained. The properties of this film are also shown in Table 1.

Control Example 1

The general procedure of Example 1 was repeated except the drying and pre-heating temperature before TD stretching was 90° C. and the water-drying speed was 5 %/sec. A 16 micron-thick balanced biaxially oriented PET film, one surface of which was very smooth and the other surface of which was fully covered with a continuous layer of the mixture, was obtained. The properties of this film are shown in Table 1. As it shows, the surface covered fully with the continuous layer was not slippery at all, and had poor abrasion resistance.

EXAMPLE 3

The general procedure of Example 1 was repeated except that carnauba wax emulsion (solid cont. 25 wt. %) was added to the water emulsion 0.08 wt. %. A 16 micron-thick balanced biaxially oriented PET film having a surface similar to Example 1 was obtained. The properties of this film are shown in Table 1.

EXAMPLE 4

The general procedure of Example 2 was repeated except that carnauba wax emulsion (solid cont. 25 wt. %) was added to the water emulsion 0.08 wt. %. A 14 micron-thick tensilized PET film having surfaces similar to Example 2 was obtained. The properties of this film are shown in Table 1.

EXAMPLE 5

The general procedure of Example 1 was repeated except that the following 3 compound mixture water-emulsion was used instead of the water emulsion in Example 1:

| | |
|---|---|
| Styrene-butadiene rubber (copolymerization ratio S/B = 85/15) emulsion (solid cont. 40 wt. %): | 0.40 wt. % |
| Carnauba wax emulsion (solid cont. 25 wt. %): | 0.20 wt. % |
| Methylcellulose: | 0.70 wt. % |

A 16 micron-thick balanced biaxially oriented PET film having surfaces similar to Example 1 was obtained. The properties of this film are shown in Table 1.

EXAMPLE 6

The general procedure of Example 2 was repeated except that the following 3 compound mixture water-emulsion was used instead of the water-emulsion in Example 2:

| | |
|---|---|
| Styrene-butadiene rubber (copolymerization ratio S/B = 85/15) emulsion (solid cont. 40 wt. %): | 0.50 wt. % |
| Chinese insect wax emulsion (solid cont. 20 wt. %): | 0.30 wt. % |
| Polyvinyl alcohol: | 0.80 wt. % |

A 14 micron-thick tensilized PET film having surfaces similar to Example 2 was obtained. The properties of this film are shown in Table 1.

EXAMPLE 7

The general procedure of Example 1 was repeated except that the following 5 compound mixture water-emulsion was used instead of the water-emulsion in Example 1.

| | |
|---|---|
| Styrene-butadiene rubber (copolymerization ratio S/B = 85/15) emulsion (solid cont. 40 wt. %): | 0.30 wt. % |
| Polydimethylsiloxane having epoxy end groups emulsion (solid cont. 20 wt. %): | 0.15 wt. % |
| Magnesium chloride emulsion (solid cont. 20 wt. %) (cross-linking catalyst): | 0.01 wt. % |
| Carnauba wax emulsion (solid cont. 25 wt. %): | 0.30 wt. % |
| Methylcellulose: | 0.5 wt. % |

A 16 micron-thick balanced biaxially oriented PET film having surfaces similar to Example 1 was obtained. The properties of this film are shown in Table 1.

EXAMPLE 8

The general procedure of Example 3 was repeated except that both surfaces of the MD stretched film were coated with the water-emulsion. A 16 micron-thick balanced biaxially oriented PET film, both surfaces of which were covered with the fine worm-like nodules, was obtained. The properties of the film are shown in Table 1.

EXAMPLE 9

The general procedure of Example 4 was repeated except that both surfaces of the first MD stretched film were coated with the water-emulsion. A 14 micron-thick tensilized PET film having surfaces similar to Example 8 was obtained. The properties of this film are shown in Table 1.

EXAMPLE 10

The general procedure of Example 6 was repeated except that both surfaces of the first MD stretched film were coated with the water emulsion. A 14 micron-thick tensilized PET film having surfaces similar to Example 8 was obtained. The properties of the film are shown in Table 1.

EXAMPLE 11

The general procedure of Example 7 was repeated except that both surfaces of the MD stretched film were coated with the water-emulsion. A 16 micron-thick balanced biaxially oriented PET film having surfaces similar to Example 6 was obtained. The properties of this film are shown in Table 1.

EXAMPLE 12

The general procedure of Example 1 was repeated except that the polyethylene terephthalate raw material used in this example was that of Example 1 with added $SiO_2$ particles having diameters of about 2 microns, in an amount of 0.02 wt. % based upon the raw material weight. A 16 micron-thick balanced biaxially oriented PET film, one surface of which is smooth and the other surface of which is covered with worm-like nodules, was obtained. The properties of this film are shown in Table 1.

EXAMPLE 13

The general procedure of Example 12 was repeated except that the content of $SiO_2$ particles was 0.04 wt. %. A 16 micron-thick balanced biaxially oriented PET film one surface of which was smooth and the other surface of which was covered with fine worm-like nodules was obtained. The properties of this film are shown in Table 1.

Control Example 2

The general procedure of Example 12 was repeated except that the content of $SiO_2$ particles was 0.10 wt. % A 16 micron-thick balanced biaxially oriented PET film, one surface of which was rough and the other surface of which was rough and covered with fine worm-like nodules, was obtained. The properties of this film are shown in Table 1.

EXAMPLE 14

The general procedure of Example 2 was repeated except that the polyethylene terephthalate raw material used in this example was that of Example 1 with added $SiO_2$ particles having diameters of about 2 microns, in an amount of 0.02 wt. % based upon the raw material weight. A 14 micron-thick tensilized PET film, one surface of which was smooth and the other surface of which was covered with fine worm-like nodules, was obtained. The properties of this film are shown in Table 1.

EXAMPLE 15

The general procedure of Example 9 was repeated except that the polyethylene terephthalate raw material used in this example was that of Example 7 with added SiO$_2$ particles having diameters of about 2 microns, in an amount of 0.03 wt. % based upon the raw material weight. A 14 micron-thick tensilized PET film, both surfaces of which were smooth and covered with fine worm-like nodules was obtained. The properties of this film are shown in Table 1.

EXAMPLE 16

The general procedure of Example 10 was repeated except that the polyethylene terephthalate raw material used in the example was that of Example 10 with added SiO$_2$ particles having diameters of about 2 microns in an amount of 0.02 wt. % based upon the raw material weight. A 14 micron-thick tensilized PET film having surfaces similar to Example 15 was obtained. The properties of this film are shown in Table 1.

Control Example 3

The general procedure of Example 1 was repeated except that the water emulsion used in the example was replaced by the following emulsion:

| | |
|---|---|
| Polymethyl methacrylate emulsion (containing cetyl pyridinium bromide 0.1 wt. %); | 0.8 wt. % |

A 16 micron-thick balanced biaxially oriented PET film, one surface of which was very smooth and the other surface of which was slippery was obtained. The properties of this film are shown in Table 1. The slippery surface had poor abrasion resistance.

TABLE 1

| | | Surface roughness[1] $R_a$ ($\mu$) | | Coefficient of friction[2] | | Abrasion[3] |
|---|---|---|---|---|---|---|
| | | non-coated surface | coated surface | coated/coated $\mu_s/\mu_k$ | coated/non-coated $\mu_s/\mu_k$ | resistance coated surface |
| Example | 1 | 0.006 | 0.007 | 0.28/0.23 | 0.38/0.35 | Good |
| | 2 | 0.004 | 0.006 | 0.30/0.25 | 0.40/0.37 | Good |
| Control Example | 1 | 0.006 | 0.007 | 2.00/1.50 | 3.05/2.50 | Poor |
| Example | 3 | 0.007 | 0.008 | 0.24/0.19 | 0.34/0.31 | Good |
| | 4 | 0.005 | 0.006 | 0.26/0.21 | 0.36/0.33 | Good |
| | 5 | 0.007 | 0.012 | 0.22/0.17 | 0.30/0.28 | Good |
| | 6 | 0.007 | 0.010 | 0.25/0.18 | 0.33/0.31 | Good |
| | 7 | 0.007 | 0.011 | 0.25/0.18 | 0.33/0.31 | Excellent |
| | 8 | 0.008[4] | 0.008 | 0.24/0.19 | 0.24/0.19 | Good |
| | 9 | 0.006[4] | 0.006 | 0.26/0.21 | 0.26/0.21 | Good |
| | 10 | 0.010[4] | 0.010 | 0.22/0.16 | 0.22/0.16 | Good |
| | 11 | 0.011[4] | 0.011 | 0.22/0.16 | 0.22/0.16 | Good |
| | 12 | 0.012 | 0.012 | 0.21/0.15 | 0.30/0.25 | Excellent |
| | 13 | 0.013 | 0.013 | 0.20/0.13 | 0.25/0.23 | Excellent |
| Control Example | 2 | 0.025 | 0.025 | 0.13/0.10 | 0.13/0.10 | Excellent |
| Example | 14 | 0.011 | 0.012 | 0.22/0.16 | 0.22/0.16 | Excellent |
| | 15 | 0.012[4] | 0.012 | 0.21/0.14 | 0.21/0.14 | Excellent |
| | 16 | 0.013[4] | 0.013 | 0.20/0.12 | 0.20/0.12 | Excellent |
| Control Example | 3 | 0.007 | 0.015 | 0.21/0.16 | 0.30/0.28 | Poor |

[1]cut-off value 0.08 mm, measuring stroke 1.2 mm
[2]ASTM D-1894-63
[3]Abrasion resistance of the coated surface is judged by the method of counting the scratches on the film which resulted from the 500 repeated-running pass of the film on a metal guide.
Excellent : No scratches are left
Good : Few scratches are left
Poor : Many scratches are left
[4]Coated-surface

We claim:

1. A polyester film at least one surface of which is covered with worm-like nodules containing a mixture of an essentially water soluble polymer having a molecular weight of about 10,000–2,000,000 and at least one water emulsifiable polymer selected from the group consisting of (A) polysiloxane having a molecular weight of about 30,000–300,000 and (B) styrene butadiene rubber having a molecular weight of about 20,000–1,000,000, the weight ratio of said water soluble polymer to said water emulsifiable polymer in the mixture being about 1–100:5–50.

2. The polyester film of claim 1 wherein one surface of said film is covered with said worm-like nodules and both surfaces have an $R_a$ value at 0.08 mm cut off of less than about 0.015$\mu$.

3. The polyester film of claim 1 wherein both surfaces of said film are covered with said worm-like nodules and both surfaces have $R_a$ values at 0.08 mm cut off of about 0.005$\mu$ to 0.015$\mu$.

4. The polyester film of claim 1 wherein said polyester is essentially polyethylene terephthalate.

5. The polyester film of claim 1 further including a natural wax.

6. The polyester film of claim 5 wherein one surface of said film is covered with worm-like nodules and both surfaces have $R_a$ values at 0.08 mm cut off of less than about 0.015$\mu$.

7. The polyester film of claim 5 wherein both surfaces of said film are covered with worm-like nodules and both surfaces have $R_a$ values at 0.08 mm cut off of about 0.005$\mu$ to 0.015$\mu$.

8. The polyester film of claim 5 wherein the weight ratios of the water soluble polymers, the water emulsifiable polymers and the natural wax is about 1–100:5–50-:5–100.

9. The polyester film of claim 5 wherein the water emulsifiable polymer includes both polysiloxane and styrene butadiene rubber, and wherein the weight ratios of the water soluble polymer, the polysiloxane, the styrene butadiene rubber, and the natural wax is about 1–100:2–25:2:25:5:100.

10. The polyester film of claim 5 wherein said polyester is polyethylene terephthalate.

11. The polyester film of claim 5 wherein said polyester is stretch oriented in the machine direction and in the transverse direction, and wherein said worm-like nodules are elongated and extend in substantially the machine direction.

12. The polyester film of claim 11 wherein said nodules are broken apart from one another in the machine direction.

13. The polyester film defined in claim 11 wherein the lengths of said nodules are about 0.1–50μ.

14. The polyester film defined in claim 11 wherein the lengths of said nodules are about 0.5–15μ.

15. The polyester film defined in claim 11 wherein the widths of said nodules are about 0.1–10μ.

16. The polyester film defined in claim 11 wherein the widths of said nodules are about 0.1–3.0μ.

17. The polyester film defined in claim 11 wherein the heights of said nodules are about 0.005–0.3μ.

18. The polyester film defined in claim 11 wherein the heights of said nodules are about 0.01–0.1μ.

19. The polyester film defined in claim 11 wherein the population density of said worm-like nodules on the surface of the film is about $10^5$–$10^9$ nodules per square centimeter.

20. The polyester film defined in claim 11 wherein the population density of said worm-like nodules on the surface of the film is about $10^6$–$10^8$ nodules per square centimeter.

21. The polyester film defined in claim 11 wherein the ASTM D-1894-63 coefficients of friction as between two slippery surfaces of the film is $\mu_s$=about 0.15–0.56 and $\mu_k$=about 0.10–0.49, where $\mu_s$ represents static coefficient and $\mu_k$ represents kinetic coefficient.

22. The polyester film defined in claim 11 wherein the ASTM D-1894-63 coefficients of friction as between one nodule-covered film surface and a conventional polyester film surface is $\mu_s$=about 0.20–0.87 and $\mu_k$=about 0.10–0.80, where $\mu_s$ represents static coefficient and $\mu_k$ represents kinetic coefficient.

23. The polyester film defined in claim 11 wherein said polysiloxane has the structure $$+\!\!\begin{array}{c} R_1 \\ | \\ Si\!-\!O \\ | \\ R_2 \end{array}\!\!\frac{}{n}$$

wherein $R_1$ is $CH_3$, $C_6H_5$ or H and wherein $R_2$ is $CH_3$, $C_6H_5$, H or a cross-linkable functional group.

24. The polyester film of claim 1 wherein said polyester is stretch oriented in the machine direction and in the transverse direction, and wherein said worm-like nodules are elongated and extend in substantially the machine direction.

25. The polyester film of claim 24 wherein said nodules are broken apart from one another in the machine direction.

26. The polyester film defined in claim 24 wherein the lengths of said nodules are about 0.1–50μ.

27. The polyester film defined in claim 24 wherein the lengths of said nodules are about 0.5–15μ.

28. The polyester film defined in claim 24 wherein the widths of said nodules are about 0.1–10μ.

29. The polyester film defined in claim 24 wherein the widths of said nodules are about 0.1–3.0μ.

30. The polyester film defined in claim 24 wherein the heights of said nodules are about 0.005–0.3μ.

31. The polyester film defined in claim 24 wherein the heights of said nodules are about 0.01–0.1μ.

32. The polyester film defined in claim 24 wherein the population density of said worm-like nodules on the surface of the film is about $10^5$–$10^9$ nodules per square centimeter.

33. The polyester film defined in claim 24 wherein the population density of said worm-like nodules on the surface of the film is about $10^6$–$10^8$ nodules per square centimeter.

34. The polyester film defined in claim 24 wherein the ASTM D-1894-63 coefficients of friction as between two slippery surfaces of the film is $\mu_s$=about 0.15–0.56 and $\mu_k$=about 0.10–0.49, where $\mu_s$ represents static coefficient and $\mu_k$ represents kinetic coefficient.

35. The polyester film defined in claim 24 wherein the ASTM D-1894-63 coefficients of friction as between one nodule-covered film surface and a conventional polyester film surface is $\mu_s$=about 0.20–0.87 and $\mu_k$=about 0.10–0.80, where $\mu_s$ represents static coefficient and $\mu_k$ represents kinetic coefficient.

36. The polyester film defined in claim 24 wherein said polysiloxane has the structure $$+\!\!\begin{array}{c} R_1 \\ | \\ Si\!-\!O \\ | \\ R_2 \end{array}\!\!\frac{}{n}$$

wherein $R_1$ is $CH_3$, $C_6H_5$ or H and wherein $R_2$ is $CH_3$, $C_6H_5$, H or a cross-linkable functional group.

37. A method of manufacturing a coated polyester film which comprises:
  (a) coating at least one surface of a unidirectionally oriented polyester film with a water emulsion containing a water soluble polymer having a molecular weight of about 10,000–2,000,000 and a water emulsifiable polymer selected from the group consisting of (A) polysiloxane having a molecular weight of about 30,000–300,000 and (B) a styrene butadiene rubber having a molecular weight of about 20,000–1,000,000, and water;
  (b) drying the coated film;
  (c) transversely stretching the dried film; and
  (d) heat setting the transversely stretched film,
the weight ratio of said water soluble polymer to said water emulsifiable polymer in the mixture being about 1–100:5–50.

38. The method of claim 37 wherein said water emulsion further contains natural wax.

39. The method of claim 37 wherein the step of machine direction stretching is interposed between steps (c) and (d).

* * * * *